US011455497B2

(12) United States Patent
Nagarajan et al.

(10) Patent No.: US 11,455,497 B2
(45) Date of Patent: Sep. 27, 2022

(54) INFORMATION TRANSITION MANAGEMENT PLATFORM

(71) Applicant: Accenture Global Solutions Limited, Dublin (IE)

(72) Inventors: Rajesh Nagarajan, Chennai (IN); Aditi Kulkarni, Bengaluru (IN); Naveen Kumar, District Ropar (IN); Roopalaxmi Manjunath, Bangalore (IN); Parul Jagtap, Delhi (IN)

(73) Assignee: Accenture Global Solutions Limited, Dublin (IE)

( * ) Notice: Subject to any disclaimer, the term of this patent is extended or adjusted under 35 U.S.C. 154(b) by 533 days.

(21) Appl. No.: 16/515,864

(22) Filed: Jul. 18, 2019

(65) Prior Publication Data

US 2020/0026966 A1 Jan. 23, 2020

(30) Foreign Application Priority Data

Jul. 23, 2018 (IN) .............................. 201841027556

(51) Int. Cl.
*G06K 9/62* (2022.01)
*G06F 16/683* (2019.01)
*G06F 40/226* (2020.01)

(52) U.S. Cl.
CPC ......... *G06K 9/6262* (2013.01); *G06F 16/685* (2019.01); *G06F 40/226* (2020.01); *G06K 9/627* (2013.01); *G06K 9/6256* (2013.01)

(58) Field of Classification Search
CPC .... G06K 9/6262; G06K 9/6256; G06K 9/627; G06K 9/00751; G06K 9/6228;
(Continued)

(56) References Cited

U.S. PATENT DOCUMENTS 9,710,461 B2    7/2017  Smith et al.
2005/0027696 A1* 2/2005  Swaminathan ........ G06Q 10/06
(Continued)

FOREIGN PATENT DOCUMENTS

AU    2019208146 B2    2/2021
JP    2015501059 A     1/2015
WO    2006023622 A2    3/2006

OTHER PUBLICATIONS

Chen M., et al., "A High-precision Duplicate Image Deduplication Approach", Journal of Computers, 2013, vol. 8 (11), pp. 2768-2775.
(Continued)

*Primary Examiner* — Stephen S Hong
*Assistant Examiner* — Ahamed I Nazar
(74) *Attorney, Agent, or Firm* — Harrity & Harrity, LLP

(57) ABSTRACT

A device may receive audio-video content regarding a system; segment the audio-video content to generate audio content and video content; process the audio content based on generating the audio content; process the video content based on generating the video content; identify a hierarchy for the set of sections based on processing the audio content and the video content; generate a system understanding document based on the hierarchy of the set of sections and based on the audio content and the video content; and store the system understanding document in a knowledge base.

20 Claims, 8 Drawing Sheets

(58) Field of Classification Search
CPC ... G06K 9/6287; G06F 16/685; G06F 40/226; G06F 16/345; G06F 40/20; G06F 40/30
See application file for complete search history.

(56) References Cited

U.S. PATENT DOCUMENTS

| | | | | |
|---|---|---|---|---|
| 2008/0281764 | A1* | 11/2008 | Baxter | G06K 9/629 706/12 |
| 2009/0048833 | A1* | 2/2009 | Fritsch | G10L 15/1815 704/235 |
| 2012/0047106 | A1* | 2/2012 | Swaminathan | G06Q 10/06 706/60 |
| 2012/0232902 | A1* | 9/2012 | Bocchieri | G10L 15/063 704/243 |
| 2012/0236201 | A1* | 9/2012 | Larsen | H04N 21/439 348/468 |
| 2015/0082349 | A1* | 3/2015 | Ishtiaq | H04N 21/4884 725/40 |
| 2016/0147737 | A1* | 5/2016 | Ryu | G06F 40/211 704/9 |
| 2016/0358632 | A1* | 12/2016 | Lakhani | H04N 9/802 |
| 2017/0199878 | A1* | 7/2017 | Ramasamy | G06F 8/10 |
| 2018/0005037 | A1 | 1/2018 | Smith, IV et al. | |
| 2018/0063601 | A1* | 3/2018 | Chee | H04N 21/252 |
| 2018/0288471 | A1* | 10/2018 | Cremer | H04N 21/8113 |
| 2019/0236371 | A1* | 8/2019 | Boonmee | G06K 9/6269 |
| 2020/0320293 | A1* | 10/2020 | Yang | G06T 11/001 |

OTHER PUBLICATIONS

Yang X., et al., "Near-Duplicate Detection for Images and Videos", Proceedings of the First ACM Workshop on Large-scale Multimedia Retrieval and Mining, Oct. 23, 2009, pp. 73-80.
Michael Heilman, "Automatic Factual Question Generation from Text", https://lti.cs.cmu.edu/sites/default/files/research/thesis/2011/michael_heilman_automatic_factual_question_generation_for_reading_assessment.pdf, Mar. 29, 2010, 203 pages.
GitHub, Inc., "tensorflow/models", https://github.com/tensorflow/models, Sep. 21, 2017, 2 pages.
GitHub, Inc., "tzutalin/labelImg", https://github.com/tzutalin/labelImg, 2015, 6 pages.
Malioutov et al., "Minimum Cut Model for Spoken Lecture Segmentation", https://people.csail.mit.edu/regina/my_papers/seg.pdf, 2006, 4 pages.

* cited by examiner

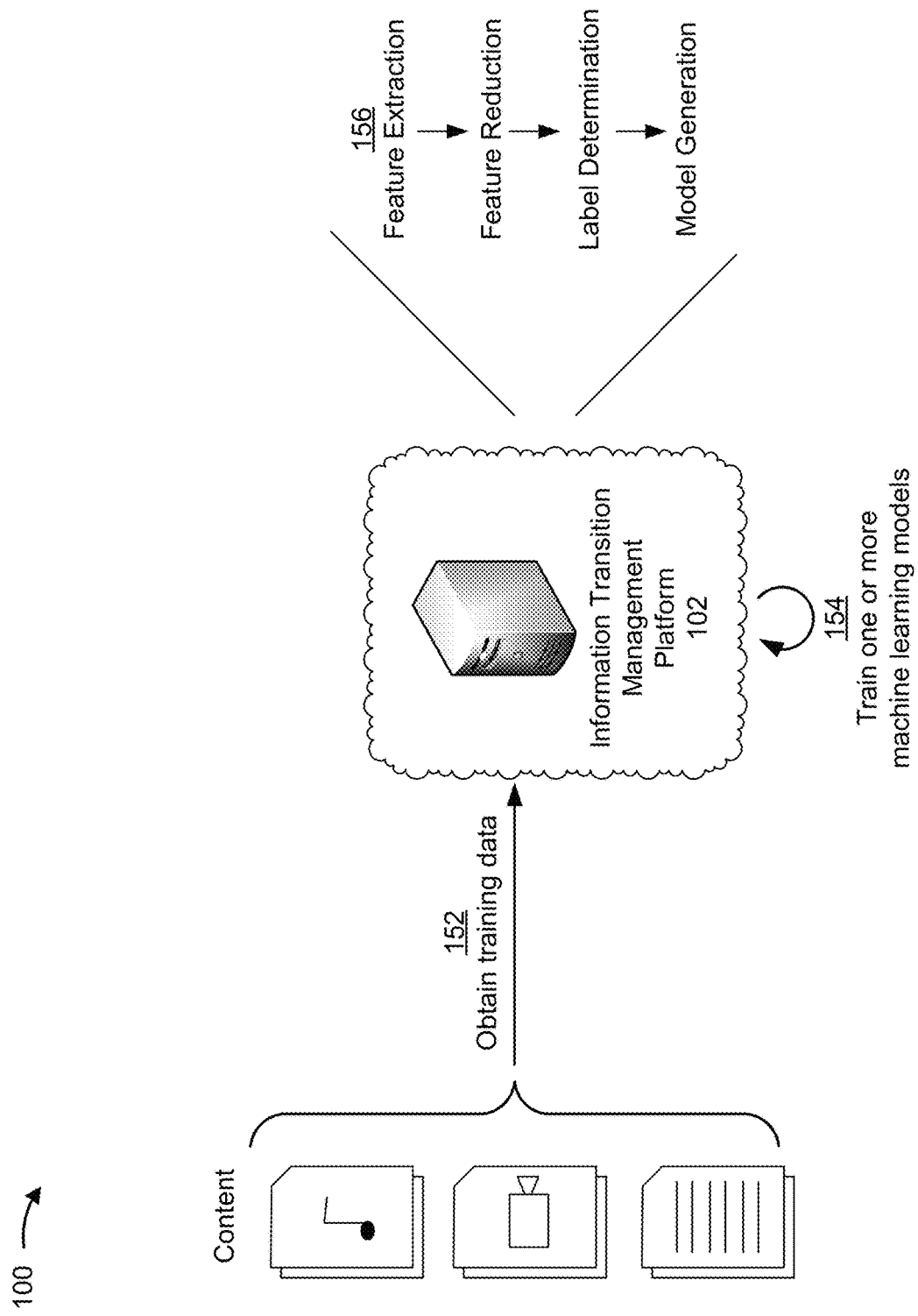

INFORMATION TRANSITION MANAGEMENT PLATFORM

RELATED APPLICATION(S)

This application claims priority under 35 U.S.C. § 119 to Indian Patent Application No. 201841027556, filed on Jul. 23, 2018, and entitled "DATA TRANSITION MANAGEMENT PLATFORM," the content of which is incorporated by reference herein in its entirety.

BACKGROUND

An information transition event may occur when information is to be transferred from a first entity to a second entity. For example, information may be transferred from a first service provider at a first location to a second service provider at a second location. Similarly, when a first person transitions out of a role and a second person transitions into the role, information may be transferred from a first system used by the first person to a second system used by the second person. In this case, a first client device used by the first person may transfer data to a second client device used by the second person. Additionally, or alternatively, the first person may prepare documentation regarding a role, and the first client device may transmit the documentation to the second client device, which may provide the documentation for display via a user interface. The documentation may include code documentation, video recordings, design documents, and/or the like. In some cases, the documentation may take the form of a system understanding document that provides information regarding a system, a process, a procedure, a role, a task, and/or the like.

SUMMARY

According to some implementations, a device may include one or more memories; and one or more processors, communicatively coupled to the one or more memories, configured to receive audio-video content regarding a system; segment the audio-video content to generate audio content and video content; process the audio content based on generating the audio content, wherein processing the audio content includes: generating a transcript of the audio content, performing natural language processing on the transcript of the audio content, and identifying a set of sections of the transcript of the audio content based on performing natural language processing; process the video content based on generating the video content, wherein processing the video content includes: capturing images from the video content, deduplicating the captured images from the video content, and classifying the captured images into the set of sections based on deduplicating the images; identify a hierarchy for the set of sections based on processing the audio content and the video content; generate a system understanding document based on the hierarchy of the set of sections and based on the audio content and the video content; and store the system understanding document in a knowledge base.

According to some implementations, a method may include receiving, by a device, content; segmenting, by the device, the content into a set of segments, wherein each segment of the set of segments is a different content type of a set of content types, wherein the set of content types includes at least one of audio content, video content, or image content; processing, by the device, the set of segments to generate a system understanding document for a subject of the content using a corresponding content analysis model of a set of content analysis models, wherein each content analysis model corresponds to a content type of the set of content types, wherein the processing includes: classifying, by the device, a segment, of the set of segments, using a corresponding content analysis model, of the set of content analysis models; determining, by the device, a hierarchical position of the segment in the system understanding document based on classifying the segment; and labeling, by the device, the segment based on classifying the segment and based on the hierarchical position of the segment; and providing, by the device, the system understanding document for display via a user interface.

According to some implementations, a non-transitory computer-readable medium may store one or more instructions. The one or more instructions, when executed by one or more processors of a device, may cause the one or more processors to receive content relating to a system; process the content using a machine learning model to classify the content into a set of sections of a system understanding document; generate the system understanding document based on processing the content; generate, for the system understanding document and using a question generation technique, an evaluation of system understanding; generate, for the system understanding document, a data transition plan, wherein the data transition plan includes at least one of a scheduling component, a role assignment component, or an approval component; generate, for the system understanding document, a set of training sessions for a set of topics of the system understanding document; generate, for the system understanding document, a knowledge base of the set of topics of the system understanding document; and provide, via a user interface, access to the evaluation, the data transition plan, the set of training sessions, and the knowledge base.

BRIEF DESCRIPTION OF THE DRAWINGS

FIGS. 1A-1C are diagrams of an example implementation described herein.

DETAILED DESCRIPTION

Figure 1B:
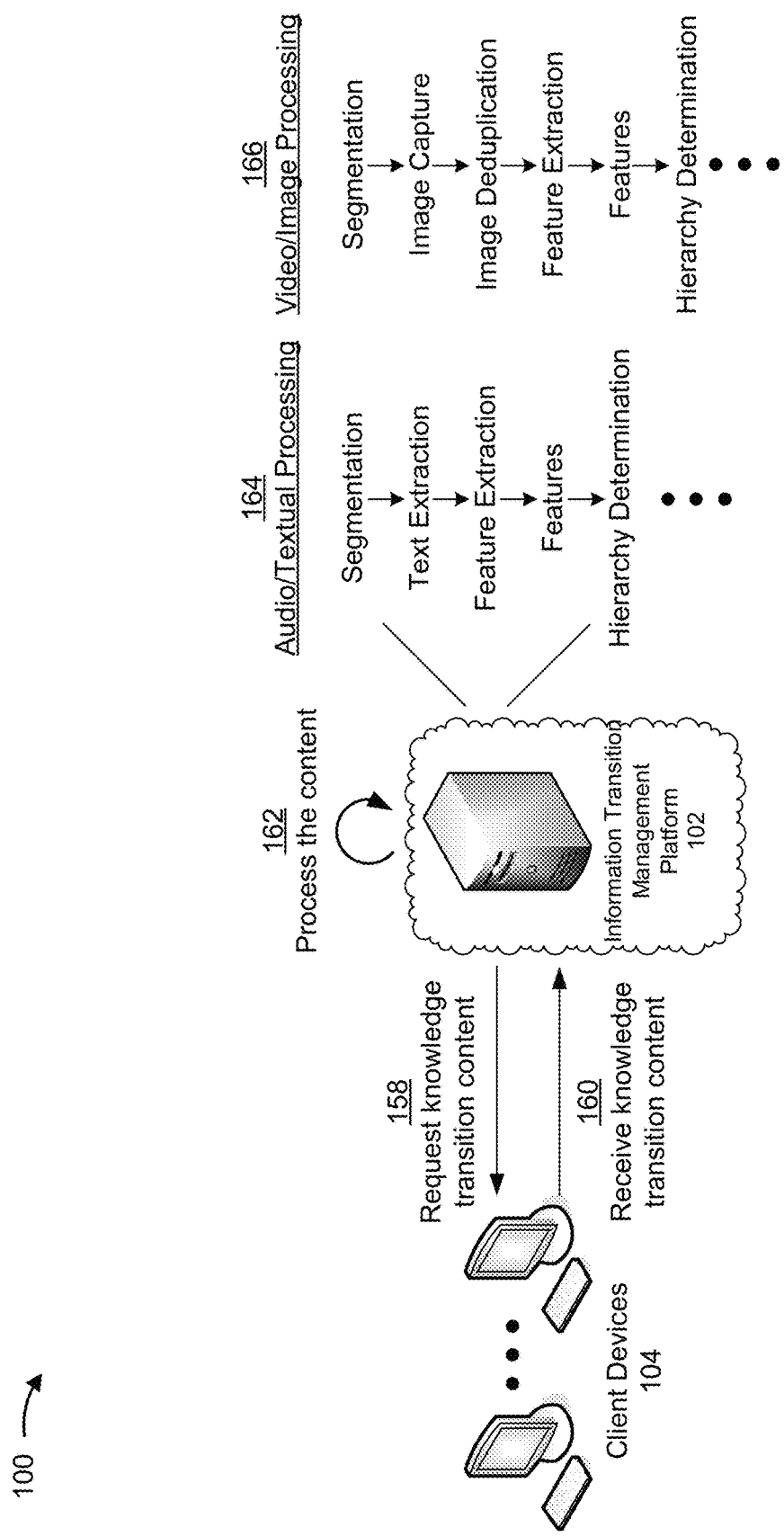

The following detailed description of example implementations refers to the accompanying drawings. The same reference numbers in different drawings may identify the same or similar elements.

During an information transition event, a first device used by a first person at a first location may provide information to a second device at a second location to enable a second person at the second location to access the information. For example, during a software development process, a first software developer may stop working on a software development project and may cause a first client device to provide documentation regarding the software development project to a second client device for display to a second software developer.

The documentation may take the form of a system understanding document. A system understanding document may be a hierarchically arranged document that identifies aspects of a particular subject, such as functions of program code, processes for managing tickets, requirements for a system, procedures, schedules, and/or the like. As an example, a system understanding document may include information describing a technical environment of a system, an application and functional architecture of the system, user management for the system, application maintenance processes and procedures for the system, and/or the like.

As systems become increasingly complex, a quantity of authors of a system understanding document may increase and an amount of time to compile the system understanding document may also increase. Errors in the system understanding document may result in a failure of information transfer. Additionally, a failure by a recipient of the system understanding document (e.g., a person to whom information is provided) may also result in a failure of information transfer. Errors in the system understanding document and/or a failure of a recipient to understand the system understanding document may result from information being improperly categorized, omitted, inaccurate, and/or the like. These failures may result in system failures, poor system performance, and/or the like when a recipient of the system understanding document attempts to perform tasks relating to a subject of the system understanding document.

Although some aspects are described in terms of software systems, other types of systems also are contemplated. For example, system understanding documents may be used in different environments, different industries, and/or the like.

Some implementations described herein provide an information transition management platform. For example, the information transition management platform may collect information regarding a subject, may automatically process the information to generate a system understanding document, and may provide output to enable information transition to a recipient of the system understanding document. In some aspects, the information transition management platform may automatically generate evaluations to test understanding of a subject by a recipient of the system understanding document. For example, the information transition management platform may use an automatically generated evaluation to determine whether a replacement software developer understands software functions that the replacement software developer is to debug, whether a power grid operator understands a procedure for preventing a problem with a power grid, whether a customer service representative understands how to use a communication channel for communication with a customer, and/or the like. In these cases, the information transition management platform may control access to a system (e.g., by automatically operating system permissions) to prevent damage to a system caused by a recipient of a system understanding document who does not successfully complete an evaluation. Additionally, or alternatively, the information transition management platform may generate recommendations for improving understanding of a subject of a system understanding document, may generate an information transition plan (e.g., a schedule, a set of role assignments, a set of task assignments, and/or the like), and/or the like to facilitate information transition.

In this way, the information transition management platform enables successful completion of an information transition event with a reduced likelihood of errors occurring from a lack of understanding of a subject of a system understanding document. Furthermore, the information transition management platform reduces an amount of time to generate a system understanding document and to transition information, relative to previous approaches. In this way, the information transition management platform may reduce downtime of a system relating to an information transition event, thereby improving system operation. Moreover, the information transition management platform may improve information transition events by reducing errors and/or failures to adequately transition information relative to other techniques for information transition, such as by reducing errors associated with manual intervention in information transitioning. Based on reducing time, errors, and failures associate with transitioning information, the information transition management platform reduces resources wasted in transitioning information, a likelihood of causing errors in the functioning of a software or hardware system, and/or the like.

Furthermore, implementations described herein use a rigorous, computerized process to classify information, generate a hierarchical arrangement of the information, and provide the information to enable information transfer between entities (e.g., between systems, client devices, persons, and/or the like). For example, currently there does not exist a technique to accurately assess thousands, millions, or tens of millions of documents, diagrams, images, and/or the like that are associated with describing a system, process, or procedure to enable efficient information transfer.

Figure 1C:
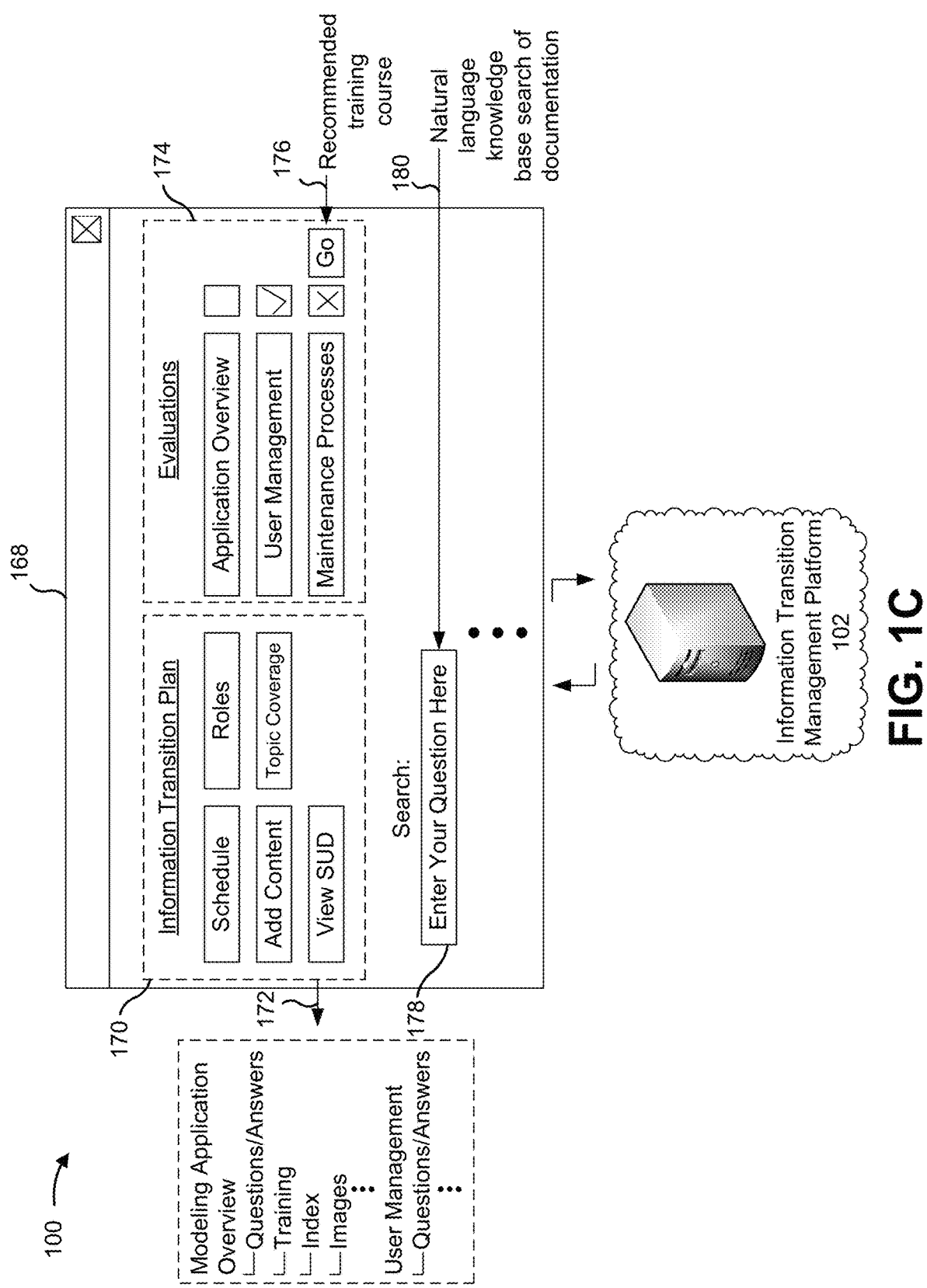

FIGS. 1A-1C are diagrams of an example implementation 100 described herein. As shown in FIG. 1A, example implementation 100 includes an information transition management platform 102.

As further shown in FIG. 1A, and by reference number 152, information transition management platform 102 may obtain training data for training one or more machine learning models. For example, information transition management platform 102 may obtain documentation (e.g., code documentation, process documentation, instruction manuals, reference documents, user comments, and/or the like) for a set of processes and/or systems for which information transition events have been completed. Additionally, or alternatively, information transition management platform 102 may receive video recordings, audio recordings, audio-video recordings, meeting minutes, training programs, images, and/or the like for the set of processes and/or systems for which information transition events have been completed. In some implementations, information transition management platform 102 may obtain training data separate from information transition events. For example, information transition management platform 102 may obtain a corpus of words, information regarding semantic meanings of words, and/or the like for use in natural language processing of the training data. Additionally, or alternatively, information transition management platform 102 may obtain audio recordings and associated transcripts for training a voice-to-text capability.

In some implementations, information transition management platform 102 may obtain a subset of available training data. For example, information transition management platform 102 may obtain training data relating to a particular organization or a set of organizations. In this case, information transition management platform 102 may identify a set of organizations similar to a particular organization for which an information transition event is to occur, such as based on a common industry, a common set of roles, a common location, a common type of project, procedure, or process, a common type of software development project delivery method, and/or the like. In this case, information transition management platform 102 may obtain training data relating to information transition events performed in connection with the set of similar organizations.

In this way, information transition management platform 102 may enable generation of one or more machine learning models described herein with reduced training data relative to using training data relating to non-similar organizations, the use of which may result in a model trained to perform classifications of types of information and/or for types of systems, procedures, or processes that are unlikely to be used by a particular organization for which an information transition event is to occur. Based on reducing the amount of training data, information transition management platform 102 may reduce a utilization of processing resources to process the training data, memory resources to store the training data, network resources to obtain the training data, and/or the like.

As further shown in FIG. 1A, and by reference numbers 154 and 156, information transition management platform 102 may train the one or more machine learning models. For example, information transition management platform 102 may process the training data to perform feature extraction, feature reduction, label determination, and model generation to generate the one or more models. Feature extraction may refer to identifying one or more variables in the training data that predict one or more outcomes, such as identifying one or more words that predict assignment to a particular section of a system understanding document. Feature reduction may refer to selecting a subset of extracted features with a highest predictive power, thereby reducing processing to generate and use a model relative to generating the model based on all features. Label determination may refer to identifying labels to apply to sections, sub-sections, and/or the like for a system understanding document.

In some implementations, information transition management platform 102 may train a sentence classification machine learning model. For example, information transition management platform 102 may obtain a subset of training data relating to sentences of documentation about a subject (e.g., a system), and may extract features from the subset of training data. In this case, information transition management platform 102 may perform feature reduction (e.g., to identify a subset of features with a greatest predictive power and generate a model using the subset of features rather than all features, thereby reducing processing resource utilization). In some implementations, information transition management platform 102 may utilize a particular type of classifier. For example, information transition management platform 102 may use a linear support vector classifier (SVC) technique to train the sentence classification machine learning model. In this way, information transition management platform 102 enables vectorization of sentences of a description (e.g., documentation, a transcript of a training video, and/or the like) for use in subject-based segmentation using a text segmentation model, as described in more detail herein.

In some implementations, information transition management platform 102 may train a text segmentation model to segment classified sentences into document sections. For example, information transition management platform 102 may train a minimum cut model to perform transcript segmentation on documentation regarding a subject (e.g., a system). In the minimum cut model, for example, information transition management platform 102 may represent sentences using a graph (e.g., a similarity plot), and may partition the graph into a plurality of disjoint sets of nodes (e.g., node set A and node set B). In this case, information transition management platform 102 trains the text segmentation model to minimize a cut (e.g., to minimize a sum of crossing edges between node set A and node set B). The minimized cut is a minimum normalized multiway cut representing an optimal segmentation of a quantity k sentences into a quantity i segments. Based on training the text segmentation model, information transition management platform 102 enables automated division of documentation into a set of sections, which may correspond to a set of topics regarding a subject (e.g., for a software system, the topics may include user interface design, ticket management, backend processing design, and/or the like), thereby enabling sections of a system understanding document generated based on the documentation to be provided to relevant stakeholders (e.g., for the software system, the relevant stakeholders may include a user interface designer, a ticket manager, a backend designer, and/or the like). In this way, information transition management platform 102 enables reduced utilization of network resources to distribute information during an information transition event, relative to providing an entire system understanding document to each person that is a qualified recipient of a portion of the system understanding document.

In some implementations, information transition management platform 102 may train an image deduplication model. For example, information transition management platform 102 may obtain a subset of training data relating to, for example, images captured from video recordings of training sessions regarding systems. In some implementations, information transition management platform 102 may use a Hamming distance determination technique to determine whether the images are to be classified as duplicate images (e.g., images with less than a threshold difference). In other words, information transition management platform 102 may train a model for classifying a portion of a video recording of a person as a set of duplicate images of the person, rather than as multiple different images of the person with different mouth shapes as the person speaks into a camera. In this way, information transition management platform 102 enables deduplication of images captured of a video recording, which may reduce processing utilization when classifying the images, relative to attempting to classify each image separately.

In some implementations, information transition management platform 102 may train an image classification model. For example, information transition management platform 102 may obtain a subset of training data relating to deduplicated images of video recordings of training sessions regarding systems. In this case, information transition management platform 102 may use a machine learning model to perform object detection and classification. For example, information transition management platform 102 may train the image classification model to detect and classify an image as including a system architecture diagram (e.g., superimposed into the image, drawn by a person on a blackboard, and/or the like). In this case, information transition management platform 102 may enable image capture of the system architecture diagram and inclusion of the system architecture diagram in a system understanding document rather than the whole image.

In this way, information transition management platform 102 may reduce a memory utilization for images that are stored, relative to storing whole images. Additionally, or alternatively, information transition management platform 102 may train the image classification model to classify an image according to a section of a system understanding document. For example, information transition management platform 102 may train the image classification model to determine whether an image relates to a particular topic in a system understanding document, a particular section of the system understanding document, and/or the like to enable the image to be stored in a hierarchy of the system understanding document that corresponds to a subject present in the image.

In some implementations, information transition management platform 102 may validate the one or more machine learning models. For example, information transition management platform 102 may obtain validation data (e.g., which may be a portion of the training data not used to train the one or more machine learning models or may be separate data from the training data) and may use the validation data to validate an accuracy of the one or more machine learning models. In this case, based on validating the accuracy of the one or more machine learning models, information transition management platform 102 may store the one or more machine learning models for use in analyzing content for a subsequent information transition task.

As shown in FIG. 1B, and by reference numbers 158 and 160, information transition management platform 102 may request and receive content, such as information transition content, from one or more stakeholders in a subject for which a system understanding document is to be generated (e.g., a system, a process, a procedure, and/or the like). For example, information transition management platform 102 may transmit one or more content generation task requests to client devices 104 to provide for display to one or more users of a system, and may receive information regarding functionality of the system for an information transition event. As an example, information transition management platform 102 may request that a first developer, who is to be transferred from a first project to a second project, record a video documenting operations of the first project to enable information transition to a second developer, who is to replace the first developer on the first project. In some implementations, information transition management platform 102 may receive particular types of content. For example, information transition management platform 102 may receive audio content, video content, audio-video content, textual content, a combination thereof, and/or the like.

As further shown in FIG. 1B, and by reference number 162, information transition management platform 102 may process the content. For example, information transition management platform 102 may perform audio and/or textual processing, as shown by reference number 164. Additionally, or alternatively, information transition management platform 102 may perform video and/or image processing, as shown by reference number 166. In some implementations, as described in more detail herein, information transition management platform 102 may perform feature extraction to identify features of text and/or images. For example, information transition management platform 102 may identify one or more portions of the text and/or images that are predictive of a section of a system understanding document to which the text and/or images are to be assigned. In this case, based at least in part on the features, a set of document labels or meta data, and/or the like, information transition management platform 102 may use one or more machine learning models, logistic regression algorithms, and/or the like to classify the text and/or images, as described herein.

In some implementations, information transition management platform 102 may segment the content when processing the content. For example, information transition management platform 102 may segment the content into different content types for processing using different content analysis models corresponding to the different content types (e.g., machine learning models trained for processing a particular content type, as described above). In this case, information transition management platform 102 may segment the content into audio content for processing using a first set of machine learning models, textual content for processing using a second set of machine learning models, video content for processing using a third set of machine learning models, image content for processing using a fourth set of machine learning models, and/or the like.

In some implementations, information transition management platform 102 may convert a form of content. For example, information transition management platform 102 may use a voice-to-text transcription functionality to convert audio content into textual content for processing using text based machine learning models. In this way, information transition management platform 102 may generate a transcript of audio content to process the audio content using natural language processing. In some implementations, information transition management platform 102 may vectorize sentences of the textual content, segment the vectorized sentences of the textual content, predict a section of a system understanding document to which each segment is to be assigned (e.g., using a machine learning model), and assign each segment to a predicted section. In this way, information transition management platform 102 assigns information to sections of a system understanding document to generate the system understanding document.

Additionally, or alternatively, information transition management platform 102 may capture images from video content for processing using image based machine learning models. In this case, information transition management platform 102 may capture a set of screen shots (e.g., a screen shot for each frame of video, for each set of multiple frames of video, such as one image for each 15 seconds of video, and/or the like), and may perform image deduplication using an image deduplication model. In some implementations, information transition management platform 102 may apply labels to the images. For example, information transition management platform 102 may generate extensible markup language files describing each image in terms of metadata, content, and/or the like for utilization in subsequent processing of the images to assign the images to sections of a system understanding document.

In some implementations, information transition management platform 102 may generate a label map, and may use the label map to apply the labels to the images. A label map may include a set of labels of an object detection machine learning model. For example, information transition management platform 102 may determine a set of possible objects that the object detection machine learning model is trained to detect, and may determine a likelihood that an image includes any of the set of possible objects. In this case, information transition management platform 102 may select one or more labels to apply to the image that are associated with a threshold likelihood that the image contains a corresponding object.

In some implementations, information transition management platform 102 may classify the images. For example, information transition management platform 102 may use an image classification model to assign an image (e.g., an image of an application architecture) to a section of a system understanding document (e.g., a backend design section for a software system). In this way, information transition management platform 102 generates the system understanding document from video and/or image content.

In some implementations, information transition management platform 102 may generate a score in connection with classifying an image. The score may represent a predicted accuracy of a classification of an image, and information transition management platform 102 may determine the score based at least in part on a predictive power of a machine learning model used to classify the image. In other words, information transition management platform 102 may determine a predicted accuracy of a classification based at least in part on training of the machine learning model.

In some implementations, information transition management platform 102 may automatically include the image in a particular section of a system understanding document based on the score for the image satisfying a threshold. Additionally, or alternatively, when the score does not satisfy a threshold, information transition management platform 102 may assign the image for manual classification and may use the manual classification as information for continuing to train the classification model (e.g., by using a supervised machine learning technique). In this way, information transition management platform 102 trains the classification model with an increased level of accuracy and a reduced utilization of processing resources relative to non-supervised machine learning techniques.

In some implementations, information transition management platform 102 may identify a hierarchy for a set of sections of the system understanding document and/or a set of topics included in the set of sections of the system understanding document. For example, based on processing the content, information transition management platform 102 may determine dependencies between different sections, and may assign, for example, a first section as a sub-section of a second section, and may hierarchically nest topics within each section. In this way, information transition management platform 102 applies a hierarchical arrangement to the system understanding document to enable different sections of the system understanding document to be categorized as relevant to different roles, users, and/or the like.

In some implementations, information transition management platform 102 may analyze a system to automatically determine the hierarchy for the system understanding document. For example, information transition management platform 102 may automatically parse program code of a software system to determine a hierarchy of the software system. In this case, information transition management platform 102 may arrange the system understanding document according to a hierarchy corresponding to the hierarchy of the software system. In this way, information transition management platform 102 ensures that information is presentable in a manner relevant to the underlying system that is a subject of the system understanding document.

In some implementations, information transition management platform 102 may store the system understanding document. For example, information transition management platform 102 may store the system understanding document in a knowledge base, which may provide access to users of, for example, a system that is a subject of the system understanding document. Additionally, or alternatively, information transition management platform 102 may distribute portions of the system understanding document. For example, information transition management platform 102 may transmit portions of the system understanding document to a set of client devices (e.g., client devices 104 used by relevant stakeholders for a subject of the system understanding document) for display via a set of user interfaces, as described in more detail herein.

As shown in FIG. 1C, information transition management platform 102 may provide a user interface 168 (e.g., a web application user interface) with which to provide information relating to the system understanding document for display. For example, as shown by reference number 170, information transition management platform 102 may provide information relating to an information transition plan. For example, information transition management platform 102 may provide information identifying a schedule for obtaining content and/or providing portions of the system understanding document. Additionally, or alternatively, information transition management platform 102 may provide information identifying assigned roles based on levels of understanding of the system determined based on evaluations, as described in more detail herein. For example, information transition management platform 102 may automatically determine, based on evaluations of recipients of the system understanding document, a set of roles for the recipients. In this way, information transition management platform 102 enables improved operation of a subject of the system understanding document, relative to role assignments made independent of a level of understanding of the subject. Additionally, or alternatively, information transition management platform 102 may provide information enabling additional content to be included in the system understanding document.

Additionally, or alternatively, information transition management platform 102 may provide information identifying a topic coverage of the system understanding document. For example, information transition management platform 102 may indicate whether each section of the system understanding document is populated with content provided to information transition management platform 102 or whether addition content is to be generated to populate a section of the system understanding document. Moreover, information transition management platform 102 may identify topics that are included in the sections of the system understanding document. In this case, information transition management platform 102 may provide a completeness score for the system understanding document, and may determine that the system understanding document is complete based on determining a threshold completeness score.

Additionally, or alternatively, as shown by reference number 172, information transition management platform 102 may provide the system understanding document and/or sections thereof as output via the user interface. For example, information transition management platform 102 may identify sections of the system understanding document, a hierarchy of the sections, content included in each section, and/or the like.

In some implementations, as shown by reference number 174, information transition management platform 102 may provide evaluation information relating to the system understanding document. For example, information transition management platform 102 may provide a set of questions for determining a level of understanding of a user of a system described by the system understanding document. For example, when a developer is assigned to work on a portion of a software development project, information transition management platform 102 may evaluate the developer to determine whether the developer has internalized information in the system understanding document that is pertinent to a role of the developer.

In some implementations, to enable evaluation, information transition management platform 102 may generate a set of questions regarding a subject of the system understanding document. For example, information transition management platform 102 may perform a document summarization technique on, for example, the system understanding document. Based on performing the document summarization, information transition management platform 102 may perform sentence parsing, part of speech tagging, named entity recognition, and/or the like to determine a semantic meaning of portions of the document summarization. In some implementations, information transition management platform 102 may apply a subject auxiliary inversion and/or an interrogative addition to generate a question clause and convert the question clause to a natural language question. For example, information transition management platform 102 may parse a sentence and may convert a descriptive sentence regarding a subject into an interrogative statement requesting an answer regarding the subject. In this way, information transition management platform 102 automatically generates questions regarding the subject from a description of the subject included in the system understanding document.

In some implementations, information transition management platform 102 may rank a set of generated questions. For example, information transition management platform 102 may generate a score for each question based on a specificity of the question, a specificity of an answer to the question, a semantically determined importance of the question, and/or the like. In this case, information transition management platform 102 may select a subset of questions with a threshold score and use the subset of questions to generate one or more evaluations for one or more users on one or more subjects and/or sections of the system understanding document. For example, information transition management platform 102 may generate multiple choice questions, subjective type answer questions, and/or the like to provide to a user to assess a level of understanding of a subject of the system understanding document.

In some implementations, information transition management platform 102 may score a set of responses (e.g., answers) to the set of questions, and may determine a user proficiency in a subject of the system understanding document. For example, information transition management platform 102 may determine whether a user has achieved a threshold score on a question set of an assessment session, and may determine whether the user has completed the assessment session successfully based on whether the user has achieved the threshold score. In this case, as shown, information transition management platform 102 may determine that the user has not completed an assessment session (e.g., a group of questions) for a first section, has a threshold proficiency for a second section based on an assessment session, and does not have a threshold proficiency for a third section based on an assessment session, as shown. In some implementations, information transition management platform 102 may generate a recommendation for the user. For example, as shown by reference number 176, information transition management platform 102 may provide a recommendation and/or access to a training program relating to a section in which the user has not demonstrated a threshold proficiency.

Additionally, or alternatively, information transition management platform 102 may automatically schedule the user for attendance at a training course, may schedule an occurrence of the training course (e.g., based on detecting a threshold quantity of users not showing proficiency in a section), as shown by reference number 178, may identify a topic for the user to self-study, and/or the like. Additionally, or alternatively, information transition management platform 102 may automatically alter a data transition plan, such as altering a schedule to provide additional time for review of the system understanding document. Additionally, or alternatively, information transition management platform 102 may provide a knowledge base, as shown by reference numbers 180. For example, information transition management platform 102 may provide natural language question and answer searching functionalities (e.g., based on generating the set of questions, using natural language processing, and/or the like), to enable a user of information transition management platform 102 to obtain information to improve a level of understanding of a subject of the system understanding document.

As indicated above, FIGS. 1A-1C are provided merely as one or more examples. Other examples may differ from what is described with regard to FIGS. 1A-1C.

Figure 2:
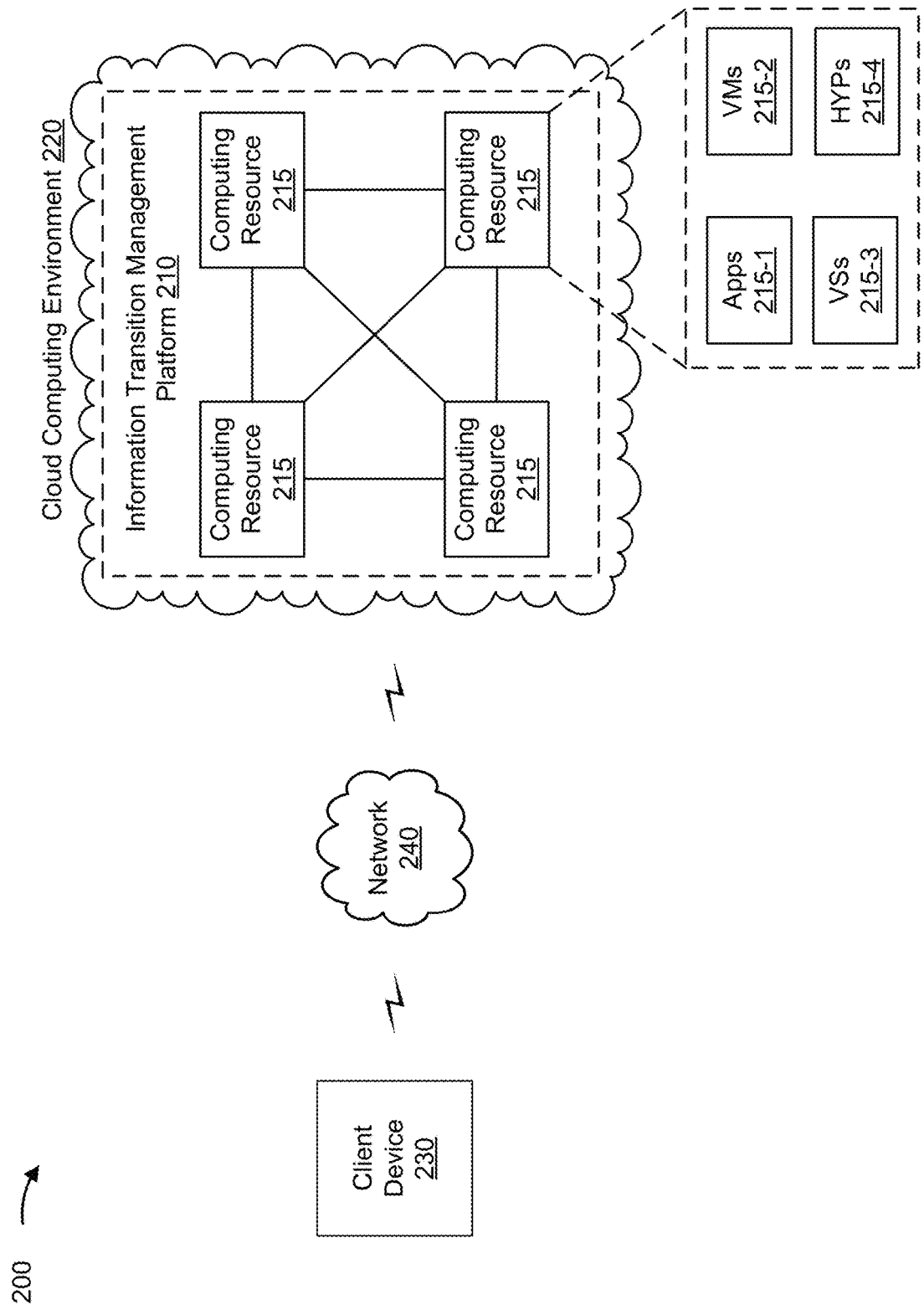
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a information transition management platform 210, a computing resource 215, a cloud computing environment 220, a client device 230, and a network 240. Devices of environment 200 may interconnect via wired connections, wireless connections, or a combination of wired and wireless connections.

Information transition management platform 210 includes one or more computing resources assigned to generate a system understanding document. For example, information transition management platform 210 may be a platform implemented by cloud computing environment 220 that may obtain content, classify the content, generate a system understanding document including the content, and provide information relating to the system understanding document. In some implementations, information transition management platform 210 is implemented by computing resources 215 of cloud computing environment 220. In some implementations, information transition management platform 210 corresponds to information transition management platform 102 shown in FIGS. 1A-1C.

Information transition management platform 210 may include a server device or a group of server devices. In some implementations, information transition management platform 210 may be hosted in cloud computing environment 220. Notably, while implementations described herein may describe information transition management platform 210 as being hosted in cloud computing environment 220, in some implementations, information transition management platform 210 may be non-cloud-based or may be partially cloud-based.

Cloud computing environment 220 includes an environment that delivers computing as a service, whereby shared resources, services, and/or the like may be provided to obtain content, classify the content, generate a system understanding document including the content, and provide information relating to the system understanding document. Cloud computing environment 220 may provide computation, software, data access, storage, and/or other services that do not require end-user knowledge of a physical location and configuration of a system and/or a device that delivers the services. As shown, cloud computing environment 220 may include information transition management platform 210 and computing resource 215.

Computing resource 215 includes one or more personal computers, workstation computers, server devices, or another type of computation and/or communication device. In some implementations, computing resource 215 may host information transition management platform 210. The cloud resources may include compute instances executing in computing resource 215, storage devices provided in computing resource 215, data transfer devices provided by computing resource 215, and/or the like. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications that may be provided to or accessed by client device 230. Application 215-1 may eliminate a need to install and execute the software applications on client device 230. For example, application 215-1 may include software associated with information transition management platform 210 and/or any other software capable of being provided via cloud computing environment 220. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program and may support a single process. In some implementations, virtual machine 215-2 may execute on behalf of a user (e.g., client device 230), and may manage infrastructure of cloud computing environment 220, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the guest operating systems and may manage the execution of the guest operating systems. Multiple instances of a variety of operating systems may share virtualized hardware resources.

Client device 230 includes one or more devices capable of receiving, generating, storing, processing, and/or providing information associated with providing a user interface associated with a system understanding document. For example, client device 230 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, client device 230 corresponds to a client device 104 shown in FIG. 1B.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
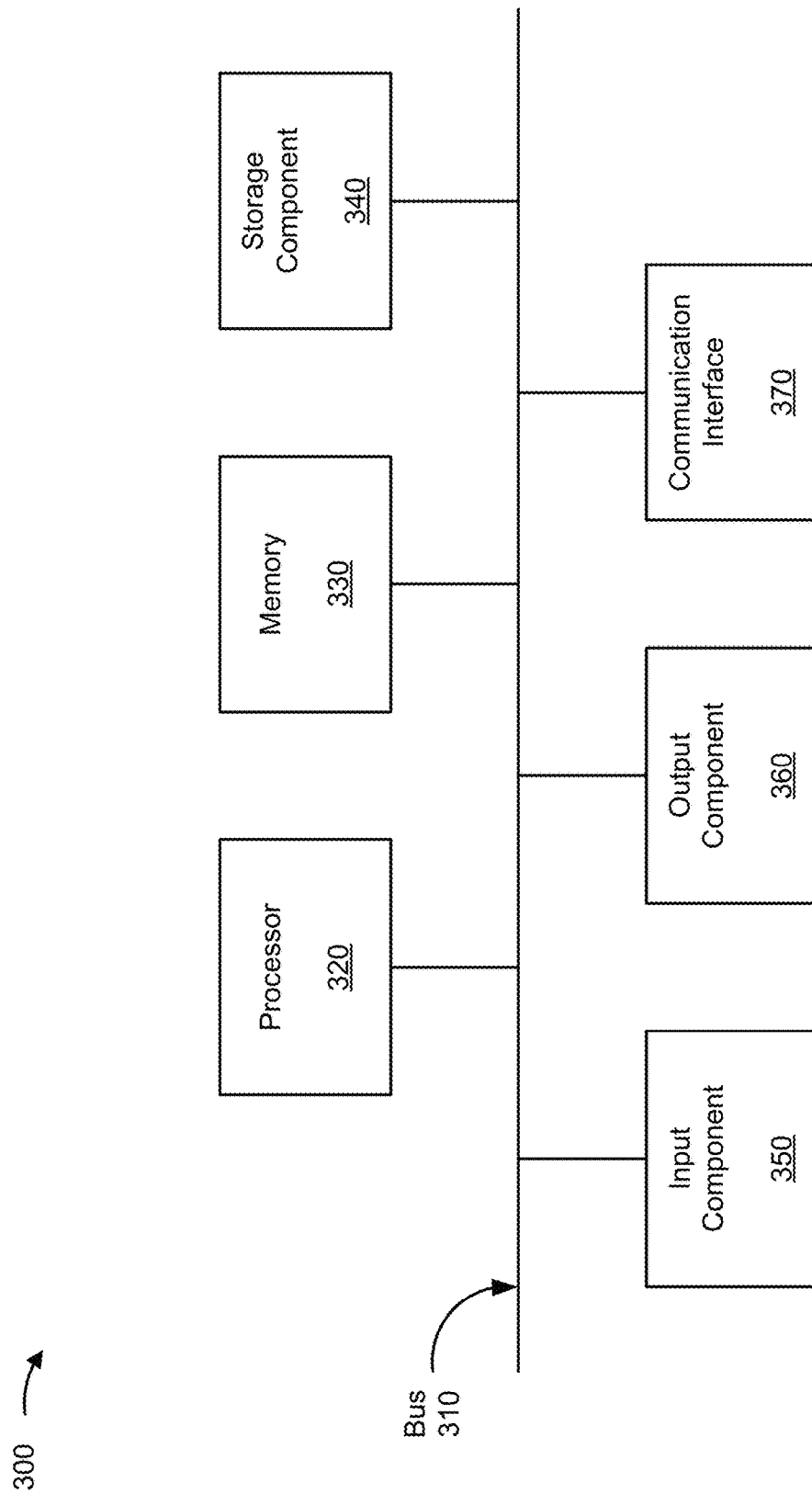
FIG. 3 is a diagram of example components of one or more devices of FIG. 2.

FIG. 3 is a diagram of example components of a device 300. Device 300 may correspond to information transition management platform 210, computing resource 215, and/or client device 230. In some implementations, information transition management platform 210, computing resource 215, and/or client device 230 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
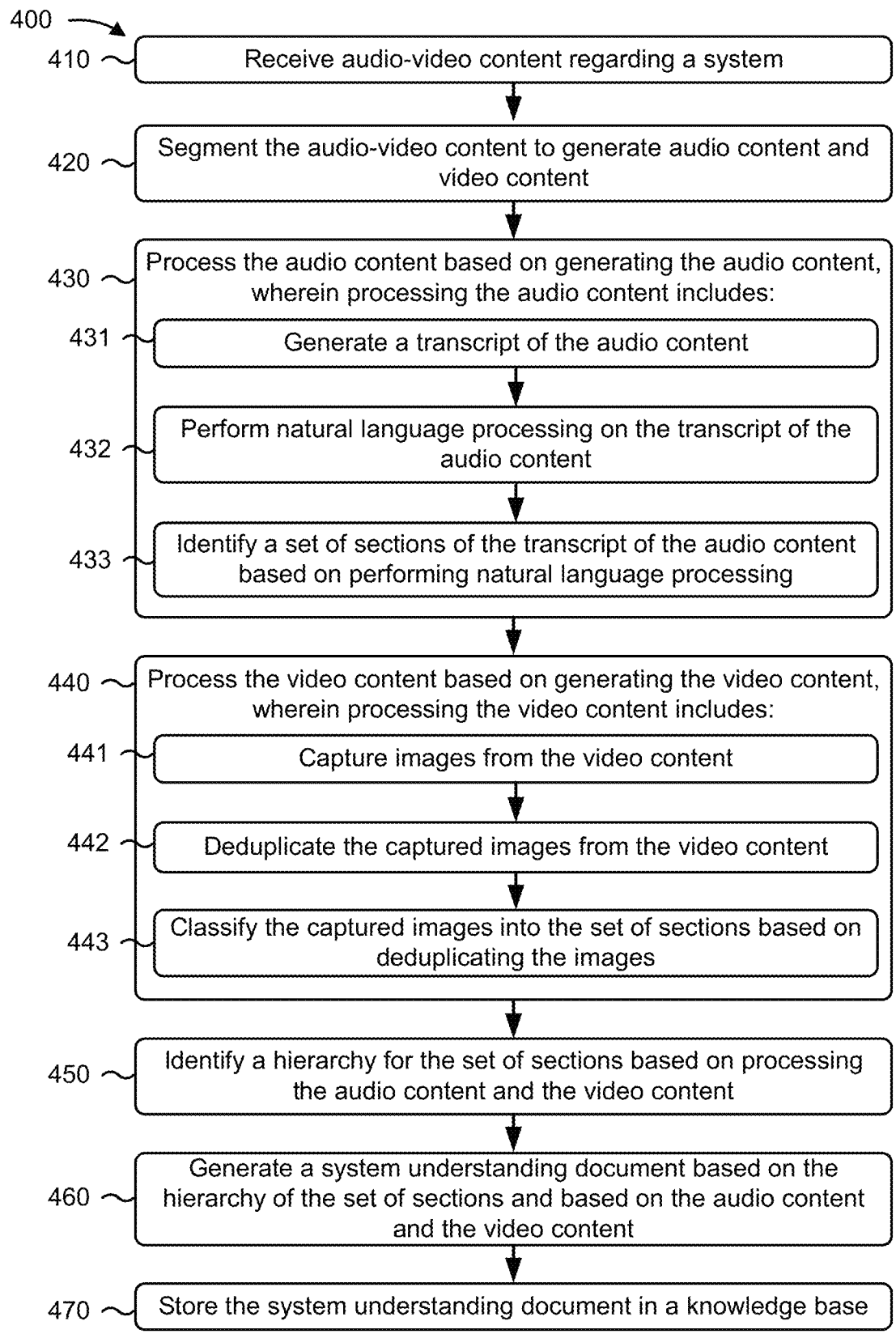
FIGS. 4-6 are flow charts of example processes for data transition management.

FIG. 4 is a flow chart of an example process 400 for information transition management. In some implementations, one or more process blocks of FIG. 4 may be performed by an information transition management platform (e.g., information transition management platform 210). In some implementations, one or more process blocks of FIG. 4 may be performed by another device or a group of devices separate from or including the information transition management platform, such as a client device (e.g., client device 230) and/or the like.

As shown in FIG. 4, process 400 may include receiving audio-video content regarding a system (block 410). For example, the information transition management platform (e.g., using processor 320, memory 330, storage component 340, input component 350, output component 360, communication interface 370 and/or the like) may receive audio-video content regarding a system, as described above.

As further shown in FIG. 4, process 400 may include segmenting the audio-video content to generate audio content and video content (block 420). For example, the information transition management platform (e.g., using processor 320, memory 330, storage component 340, input component 350, output component 360, communication interface 370 and/or the like) may segment the audio-video content to generate audio content and video content, as described above.

As further shown in FIG. 4, process 400 may include processing the audio content based on generating the audio content (block 430). For example, the information transition management platform (e.g., using processor 320, memory 330, storage component 340, input component 350, output component 360, communication interface 370 and/or the like) may process the audio content based on generating the audio content wherein processing the audio content includes and generating a transcript of the audio content, as described above.

As further shown in FIG. 4, process 400 and block 430 may include generating a transcript of the audio content (block 431). For example, the information transition management platform (e.g., using processor 320, memory 330, storage component 340, input component 350, output component 360, communication interface 370 and/or the like) may generate a transcript of the audio content, as described above.

As further shown in FIG. 4, process 400 and block 430 may include performing natural language processing on the transcript of the audio content (block 432). For example, the information transition management platform (e.g., using processor 320, memory 330, storage component 340, input component 350, output component 360, communication interface 370 and/or the like) may perform natural language processing on the transcript of the audio content, as described above.

As further shown in FIG. 4, process 400 and block 430 may include identifying a set of sections of the transcript of the audio content based on performing natural language processing (block 433). For example, the information transition management platform (e.g., using processor 320, memory 330, storage component 340, input component 350, output component 360, communication interface 370 and/or the like) may identify a set of sections of the transcript of the audio content based on performing natural language processing, as described above.

As further shown in FIG. 4, process 400 may include processing the video content based on generating the video content (block 440). For example, the information transition management platform (e.g., using processor 320, memory 330, storage component 340, input component 350, output component 360, communication interface 370 and/or the like) may process the video content based on generating the video content, as described above.

As further shown in FIG. 4, process 400 and block 440 may include capturing images from the video content (block 441). For example, the information transition management platform (e.g., using processor 320, memory 330, storage component 340, input component 350, output component 360, communication interface 370 and/or the like) may capture images from the video content, as described above.

As further shown in FIG. 4, process 400 and block 440 may include deduplicating the captured images from the video content (block 442). For example, the information transition management platform (e.g., using processor 320, memory 330, storage component 340, input component 350, output component 360, communication interface 370 and/or the like) may deduplicate the captured images from the video content, as described above.

As further shown in FIG. 4, process 400 and block 440 may include classifying the captured images into the set of sections based on deduplicating the images (block 443). For example, the information transition management platform (e.g., using processor 320, memory 330, storage component 340, input component 350, output component 360, communication interface 370 and/or the like) may classifying the captured images into the set of sections based on deduplicating the images, as described above.

As further shown in FIG. 4, process 400 may include identifying a hierarchy for the set of sections based on processing the audio content and the video content (block 450). For example, the information transition management platform (e.g., using processor 320, memory 330, storage component 340, input component 350, output component 360, communication interface 370 and/or the like) may identify a hierarchy for the set of sections based on processing the audio content and the video content, as described above.

As further shown in FIG. 4, process 400 may include generating a system understanding document based on the hierarchy of the set of sections and based on the audio content and the video content (block 460). For example, the information transition management platform (e.g., using processor 320, memory 330, storage component 340, input component 350, output component 360, communication interface 370 and/or the like) may generate a system understanding document based on the hierarchy of the set of sections and based on the audio content and the video content, as described above.

As further shown in FIG. 4, process 400 may include storing the system understanding document in a knowledge base (block 470). For example, the information transition management platform (e.g., using processor 320, memory 330, storage component 340, input component 350, output component 360, communication interface 370 and/or the like) may store the system understanding document in a knowledge base, as described above.

Process 400 may include additional implementations, such as any single implementation or any combination of implementations described below and/or in connection with one or more other processes described elsewhere herein.

In a first implementation, the information transition management platform segment may segment the transcript into sentences; vectorize the sentences in accordance with the set of sections using a sentence classifier and a sentence classification machine learning model; and assign portions of the transcript into the set of sections based on vectorizing the sentences and using a minimum cut model for transcript segmentation.

In a second implementation, alone or in combination with the first implementation, the information transition management platform segment may deduplicate the images using a Hamming distance technique, and classify the images using an image classification machine learning model.

In a third implementation, alone or in combination with one or more of the first and second implementations, the information transition management platform segment may obtain training data for training one or more machine learning models for processing the audio-video content, generate a label map for the training data, train the one or more machine learning models using the training data and the label map, validate an accuracy of the one or more machine learning models using validation data that is separate from the training data, and store the one or more machine learning models for processing the audio-video content.

In a fourth implementation, alone or in combination with one or more of the first through third implementations, the information transition management platform segment may identify a set of sessions for the system based on the system understanding document, generate a set of question sets for the set of sessions to assess system understanding, provide at least one set of question sets via a user interface, receive at least one set of answers to the at least one set of question sets, determine whether a user has achieved a threshold score on the at least one set of question sets based on the at least one set of answers, and provide information indicating whether the user has completed at least one session corresponding to the at least one set of question sets based on determining whether the user has achieved the threshold score.

In a fifth implementation, alone or in combination with one or more of the first through fourth implementations, the information transition management platform segment may provide a training program corresponding to the at least one session based on whether the user has achieved the threshold score.

In a sixth implementation, alone or in combination with one or more of the first through fifth implementations, the information transition management platform segment may receive a natural language question regarding the system, parse the system understanding document to determine a natural language response to the natural language question, and provide the natural language response.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
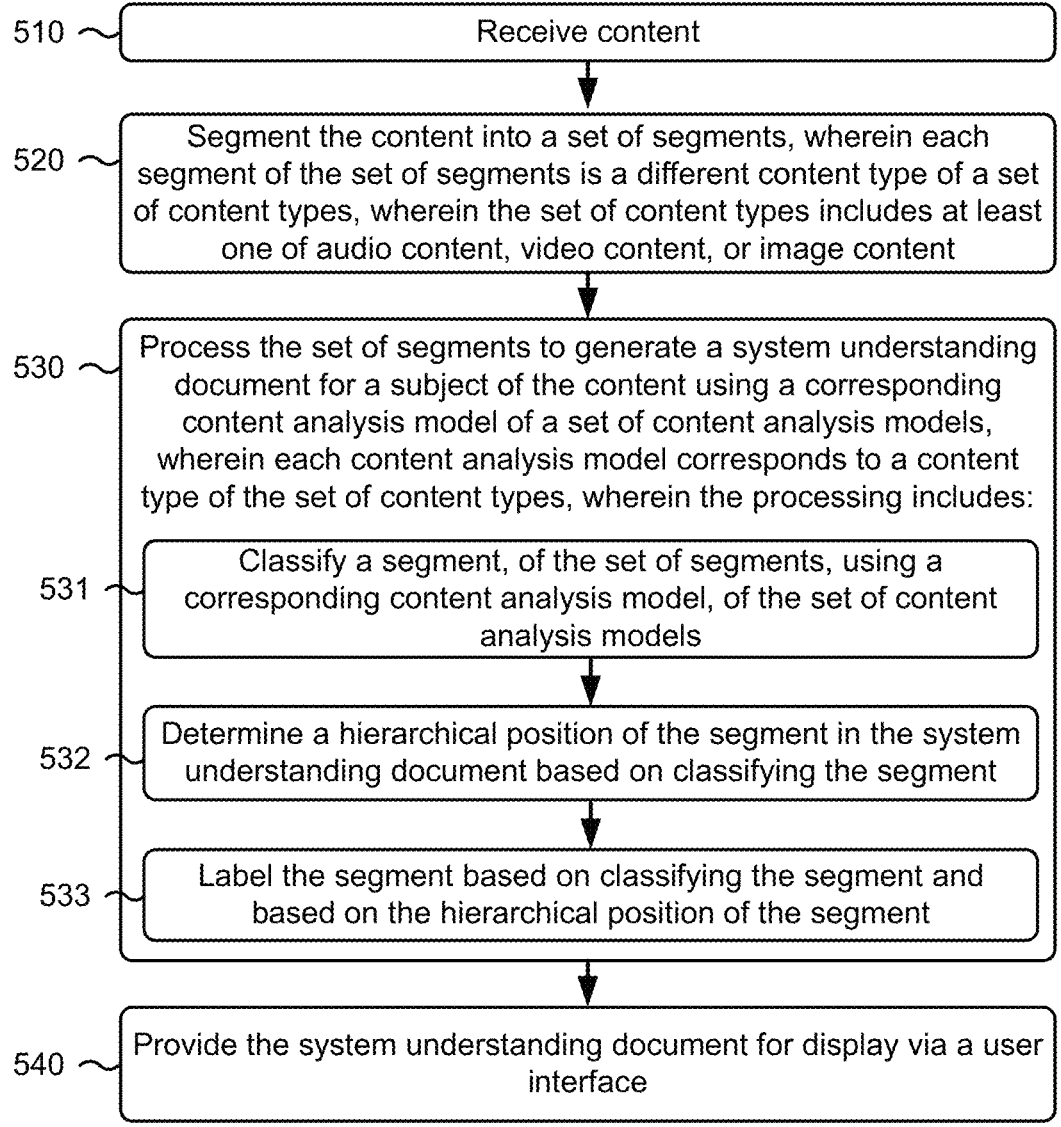

FIG. 5 is a flow chart of an example process 500 for information transition management. In some implementations, one or more process blocks of FIG. 5 may be performed by an information transition management platform (e.g., information transition management platform 210). In some implementations, one or more process blocks of FIG. 5 may be performed by another device or a group of devices separate from or including the information transition management platform, such as a client device (e.g., client device 230) and/or the like.

As shown in FIG. 5, process 500 may include receiving content (block 510). For example, the information transition management platform (e.g., using processor 320, memory 330, storage component 340, input component 350, output component 360, communication interface 370 and/or the like) may receive, by a device, content, as described above.

As further shown in FIG. 5, process 500 may include segmenting the content into a set of segments, wherein each segment of the set of segments is a different content type of a set of content types, wherein the set of content types includes at least one of audio content, video content, or image content (block 520). For example, the information transition management platform (e.g., using processor 320, memory 330, storage component 340, input component 350, output component 360, communication interface 370 and/or the like) may segment the content into a set of segments, wherein the set of content types includes at least one of audio content, video content, or image content, as described above. In some aspects, each segment of the set of segments is a different content type of a set of content types. In some aspects, the set of content types includes at least one of audio content, video content, or image content.

As further shown in FIG. 5, process 500 may include processing the set of segments to generate a system understanding document for a subject of the content using a corresponding content analysis model of a set of content analysis models, wherein each content analysis model corresponds to a content type of the set of content types (block 530). For example, the information transition management platform (e.g., using processor 320, memory 330, storage component 340, input component 350, output component 360, communication interface 370 and/or the like) may process the set of segments to generate a system understanding document for a subject of the content using a corresponding content analysis model of a set of content analysis models, as described above. In some aspects, each content analysis model corresponds to a content type of the set of content types.

As further shown in FIG. 5, process 500 and block 530 may include classifying a segment, of the set of segments, using a corresponding content analysis model, of the set of content analysis models (block 531). For example, the information transition management platform (e.g., using processor 320, memory 330, storage component 340, input component 350, output component 360, communication interface 370 and/or the like) may classify a segment, of the set of segments, using a corresponding content analysis model, of the set of content analysis models, as described above.

As further shown in FIG. 5, process 500 and block 530 may include determining a hierarchical position of the segment in the system understanding document based on classifying the segment (block 532). For example, the information transition management platform (e.g., using processor 320, memory 330, storage component 340, input component 350, output component 360, communication interface 370 and/or the like) may determine a hierarchical position of the segment in the system understanding document based on classifying the segment, as described above.

As further shown in FIG. 5, process 500 and block 530 may include labeling the segment based on classifying the segment and based on the hierarchical position of the segment (block 533). For example, the information transition management platform (e.g., using processor 320, memory 330, storage component 340, input component 350, output component 360, communication interface 370 and/or the like) may label the segment based on classifying the segment and based on the hierarchical position of the segment, as described above.

As further shown in FIG. 5, process 500 may include providing the system understanding document for display via a user interface (block 540). For example, the information transition management platform (e.g., using processor 320, memory 330, storage component 340, input component 350, output component 360, communication interface 370 and/or the like) may provide the system understanding document for display via a user interface, as described above.

Process 500 may include additional implementations, such as any single implementation or any combination of implementations described below and/or in connection with one or more other processes described elsewhere herein.

In a first implementation, process 500 includes determining, using the set of content analysis models, a level of completeness of the system understanding document; and selectively requesting additional content for inclusion in the system understanding document based on the determined level of completeness of the system understanding document.

In a second implementation, alone or in combination with the first implementation, process 500 includes generating, based on the system understanding document, a set of questions regarding the subject of the content, and providing the set of questions to enable evaluation of understanding of the subject of the content.

In a third implementation, alone or in combination with one or more of the first and second implementations, process 500 includes receiving a set of responses to the set of questions, evaluating a level of understanding of the subject of the content, generating a recommendation regarding increasing the level of understanding of the subject of the content, and providing the recommendation for display via the user interface.

In a fourth implementation, alone or in combination with one or more of the first through third implementations, process 500 includes automatically providing a training program based on the recommendation.

In a fifth implementation, alone or in combination with one or more of the first through fourth implementations, generating the set of questions includes performing a summarization procedure on the system understanding document to generate a document summary; parsing the document summary; generating a plurality of questions and a corresponding plurality of answers based on parsing the document summary; ranking the plurality of questions based on a specificity analysis of the plurality of questions and the corresponding plurality of answers; and including a subset of the plurality of questions in the set of questions based on the specificity analysis.

In a sixth implementation, alone or in combination with one or more of the first through fifth implementations, generating the plurality of questions includes determining a subject of a section of the document summary based on parsing the document summary, inverting the subject of the section to generate a question clause, and applying an interrogative phrase to the question clause to generate a question of the plurality of questions.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
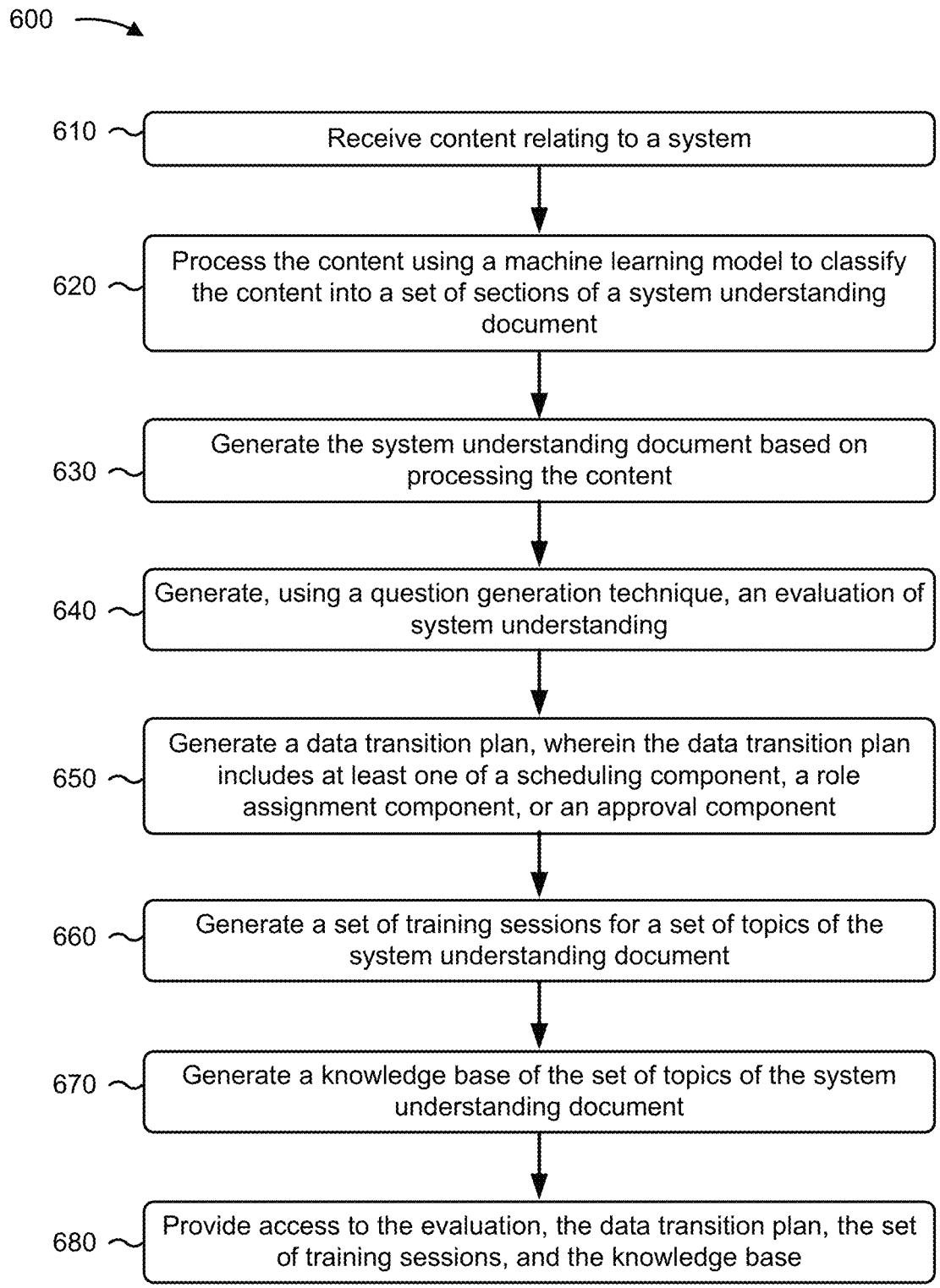

FIG. 6 is a flow chart of an example process 600 for information transition management. In some implementations, one or more process blocks of FIG. 6 may be performed by an information transition management platform (e.g., information transition management platform 210). In some implementations, one or more process blocks of FIG. 6 may be performed by another device or a group of devices separate from or including the information transition management platform, such as a client device (e.g., client device 230) and/or the like.

As shown in FIG. 6, process 600 may include receiving content relating to a system (block 610). For example, the information transition management platform (e.g., using processor 320, memory 330, storage component 340, input component 350, output component 360, communication interface 370 and/or the like) may receive content relating to a system, as described above.

As further shown in FIG. 6, process 600 may include processing the content using a machine learning model to classify the content into a set of sections of a system understanding document (block 620). For example, the information transition management platform (e.g., using processor 320, memory 330, storage component 340, input component 350, output component 360, communication interface 370 and/or the like) may process the content using a machine learning model to classify the content into a set of sections of a system understanding document, as described above.

As further shown in FIG. 6, process 600 may include generating the system understanding document based on processing the content (block 630). For example, the information transition management platform (e.g., using processor 320, memory 330, storage component 340, input component 350, output component 360, communication interface 370 and/or the like) may generate the system understanding document based on processing the content, as described above.

As further shown in FIG. 6, process 600 may include generating, using a question generation technique, an evaluation of system understanding (block 640). For example, the information transition management platform (e.g., using processor 320, memory 330, storage component 340, input component 350, output component 360, communication interface 370 and/or the like) may generate, using a question generation technique, an evaluation of system understanding, as described above.

As further shown in FIG. 6, process 600 may include generating a data transition plan, wherein the data transition plan includes at least one of a scheduling component, a role assignment component, or an approval component (block 650). For example, the information transition management platform (e.g., using processor 320, memory 330, storage component 340, input component 350, output component 360, communication interface 370 and/or the like) may generate, for the system understanding document, a data transition plan, as described above. In some aspects, the data transition plan includes at least one of a scheduling component, a role assignment component, or an approval component.

As further shown in FIG. 6, process 600 may include generating a set of training sessions for a set of topics of the system understanding document (block 660). For example, the information transition management platform (e.g., using processor 320, memory 330, storage component 340, input component 350, output component 360, communication interface 370 and/or the like) may generate, for the system understanding document, a set of training sessions for a set of topics of the system understanding document, as described above.

As further shown in FIG. 6, process 600 may include generating a knowledge base of the set of topics of the system understanding document (block 670). For example, the information transition management platform (e.g., using processor 320, memory 330, storage component 340, input component 350, output component 360, communication interface 370 and/or the like) may generate, for the system understanding document, a knowledge base of the set of topics of the system understanding document, as described above.

As further shown in FIG. 6, process 600 may include providing, via a user interface, access to the evaluation, the data transition plan, the set of training sessions, and the knowledge base (block 680). For example, the information transition management platform (e.g., using processor 320, memory 330, storage component 340, input component 350, output component 360, communication interface 370 and/or the like) may provide, via a user interface, access to the evaluation, the data transition plan, the set of training sessions, and the knowledge base, as described above.

Process 600 may include additional implementations, such as any single implementation or any combination of implementations described below and/or in connection with one or more other processes described elsewhere herein.

In a first implementation, the set of training sessions includes at least one of a video recording, an audio recording, a study document, or a reference document.

In a second implementation, alone or in combination with the first implementation, the information transition management platform may determine a level of understanding of the system based on a result of providing the evaluation, generate a recommendation for increasing the level of understanding of the system based on determining the level of understanding, and provide, via the user interface, the recommendation.

In a third implementation, alone or in combination with one or more of the first and second implementations, the recommendation relates to at least one of a training session of the set of training sessions, a topic of the set of topics for further study, or an alteration to the data transition plan.

In a fourth implementation, alone or in combination with one or more of the first through third implementations, the information transition management platform may determine a set of stakeholders relating to the system, assign a set of content generation tasks to the set of stakeholders, and receive the content as a response to the set of content generation tasks.

In a fifth implementation, alone or in combination with one or more of the first through fourth implementations, the information transition management platform may provide the access via a web application.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
one or more memories; and
one or more processors, communicatively coupled to the one or more memories, to:
receive audio-video content regarding a system;
segment the audio-video content to generate audio content and video content;
process the audio content based on generating the audio content,
wherein processing the audio content includes:
generating a transcript of the audio content;
performing natural language processing on the transcript of the audio content; and
identifying one or more portions of the transcript of the audio content that are predictive of a set of sections of a system understanding document;
process the video content based on generating the video content,
wherein processing the video content includes:
capturing images from the video content;
deduplicating the captured images from the video content; and
classifying the captured images into the set of sections of the system understanding document based on deduplicating the images;
assign the identified one or more portions of the transcript of the audio content and the classified captured images to the set of sections of the system understanding document;
identify a hierarchy for the set of sections of the system understanding document based on processing the audio content and the video content;
generate the system understanding document based on the hierarchy of the set of sections of the system understanding document and based on the assignment of the audio content and the video content; and
store the system understanding document in a knowledge base.

2. The device of claim 1, wherein the one or more processors, when processing the audio content, are to:
segment the transcript into sentences; and
vectorize the sentences in accordance with the set of sections of the system understanding document using a sentence classifier and a sentence classification machine learning model; and
wherein the one or more processors, when assigning the identified one or more portions of the transcript of the audio content are to:
assign portions of the transcript into the set of sections of the system understanding document based on vectorizing the sentences and using a minimum cut model for transcript segmentation.

3. The device of claim 1, wherein the one or more processors, when processing the video content, are to:
deduplicate the images using a Hamming distance technique; and
classify the images using an image classification machine learning model.

4. The device of claim 1, wherein the one or more processors are further to:
obtain training data for training one or more machine learning models for processing the audio-video content;
generate a label map for the training data;
train the one or more machine learning models using the training data and the label map;
validate an accuracy of the one or more machine learning models using validation data that is separate from the training data; and
store the one or more machine learning models for processing the audio-video content.

5. The device of claim 1, wherein the one or more processors are further to:
identify a set of sessions for the system based on the system understanding document;
generate a set of question sets for the set of sessions to assess system understanding;

provide at least one set of question sets via a user interface;
receive at least one set of answers to the at least one set of question sets;
determine whether a user has achieved a threshold score on the at least one set of question sets based on the at least one set of answers; and
provide information indicating whether the user has completed at least one session corresponding to the at least one set of question sets based on determining whether the user has achieved the threshold score.

6. The device of claim 5, wherein the one or more processors are further to:
provide a training program corresponding to the at least one session based on whether the user has achieved the threshold score.

7. The device of claim 1, wherein the one or more processors are further to:
receive a natural language question regarding the system;
parse the system understanding document to determine a natural language response to the natural language question; and
provide the natural language response.

8. A method, comprising:
receiving, by a device, content;
segmenting, by the device, the content into a set of segments, wherein each segment of the set of segments is a different content type of a set of content types, wherein the set of content types includes at least one of audio content, video content, or image content;
processing, by the device, the set of segments to generate a system understanding document for a subject of the content using a corresponding content analysis model of a set of content analysis models, wherein each content analysis model corresponds to a content type of the set of content types,
wherein the processing includes:
classifying, by the device, a segment, of the set of segments, as predictive of a set of sections of the system understanding document using a corresponding content analysis model, of the set of content analysis models;
assigning the segment to the set of sections of the system understanding document;
determining, by the device, a hierarchical position of the segment in the system understanding document based on the assignment of the segment; and
labeling, by the device, the segment based on classifying the segment and based on the hierarchical position of the segment; and
providing, by the device, the system understanding document for display via a user interface.

9. The method of claim 8, further comprising:
determining, using the set of content analysis models, a level of completeness of the system understanding document; and
selectively requesting additional content for inclusion in the system understanding document based on the determined level of completeness of the system understanding document.

10. The method of claim 8, further comprising:
generating, based on the system understanding document, a set of questions regarding the subject of the content; and
providing the set of questions to enable evaluation of understanding of the subject of the content.

11. The method of claim 10, further comprising:
receiving a set of responses to the set of questions;
evaluating a level of understanding of the subject of the content;
generating a recommendation regarding increasing the level of understanding of the subject of the content; and
providing the recommendation for display via the user interface.

12. The method of claim 11, further comprising:
automatically providing a training program based on the recommendation.

13. The method of claim 10, wherein generating the set of questions comprises:
performing a summarization procedure on the system understanding document to generate a document summary;
parsing the document summary;
generating a plurality of questions and a corresponding plurality of answers based on parsing the document summary;
ranking the plurality of questions based on a specificity analysis of the plurality of questions and the corresponding plurality of answers; and
including a subset of the plurality of questions in the set of questions based on the specificity analysis.

14. The method of claim 13, wherein generating the plurality of questions includes:
determining a subject of a section of the document summary based on parsing the document summary;
inverting the subject of the section to generate a question clause; and
applying an interrogative phrase to the question clause to generate a question of the plurality of questions.

15. A non-transitory computer-readable medium storing instructions, the instructions comprising:
one or more instructions that, when executed by one or more processors, cause the one or more processors to:
receive content relating to a system;
process the content using a machine learning model to classify the content into a set of sections of a system understanding document;
generate the system understanding document based on processing the content to classify segments of the content as predictive of the set of sections of the system understanding document and assign the segments to the set of sections of the system understanding document;
generate, for the system understanding document and using a question generation technique, an evaluation of system understanding;
generate, for the system understanding document, a data transition plan,
wherein the data transition plan includes at least one of a scheduling component, a role assignment component, or an approval component;
generate, for the system understanding document, a set of training sessions for a set of topics of the system understanding document;
generate, for the system understanding document, a knowledge base of the set of topics of the system understanding document; and
provide, via a user interface, access to the evaluation, the data transition plan, the set of training sessions, and the knowledge base.

16. The non-transitory computer-readable medium of claim 15, wherein the set of training sessions includes at least one of:
- a video recording,
- an audio recording,
- a study document, or
- a reference document.

17. The non-transitory computer-readable medium of claim 15, wherein the one or more instructions, when executed by the one or more processors, cause the one or more processors to:
- determine a level of understanding of the system based on a result of providing the evaluation;
- generate a recommendation for increasing the level of understanding of the system based on determining the level of understanding; and
- provide, via the user interface, the recommendation.

18. The non-transitory computer-readable medium of claim 17, wherein the recommendation relates to at least one of:
- a training session of the set of training sessions,
- a topic of the set of topics for further study, or
- an alteration to the data transition plan.

19. The non-transitory computer-readable medium of claim 15, wherein the one or more instructions, when executed by the one or more processors, further cause the one or more processors to:
- determine a set of stakeholders relating to the system; and
- assign a set of content generation tasks to the set of stakeholders;

wherein the one or more instructions, that cause the one or more processors to receive the content, cause the one or more processors to:
- receive the content as a response to the set of content generation tasks.

20. The non-transitory computer-readable medium of claim 15, wherein the one or more instructions, that cause the one or more processors to provide the access to the evaluation, the data transition plan, the set of training sessions, and the knowledge base, cause the one or more processors to:
- provide the access via a web application.

\* \* \* \* \*